C. A. S. ERICKSON.
ANIMAL TRAP.
APPLICATION FILED JUNE 5, 1915. RENEWED JULY 24, 1919.

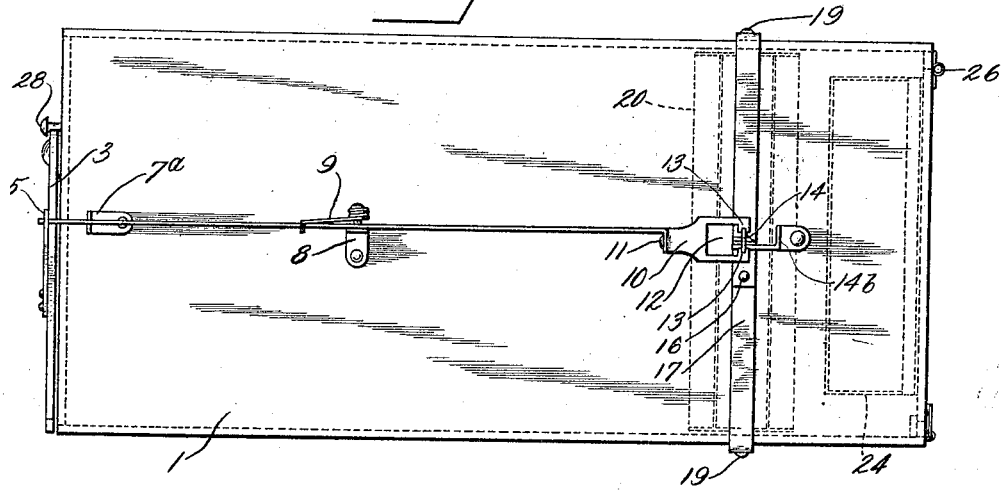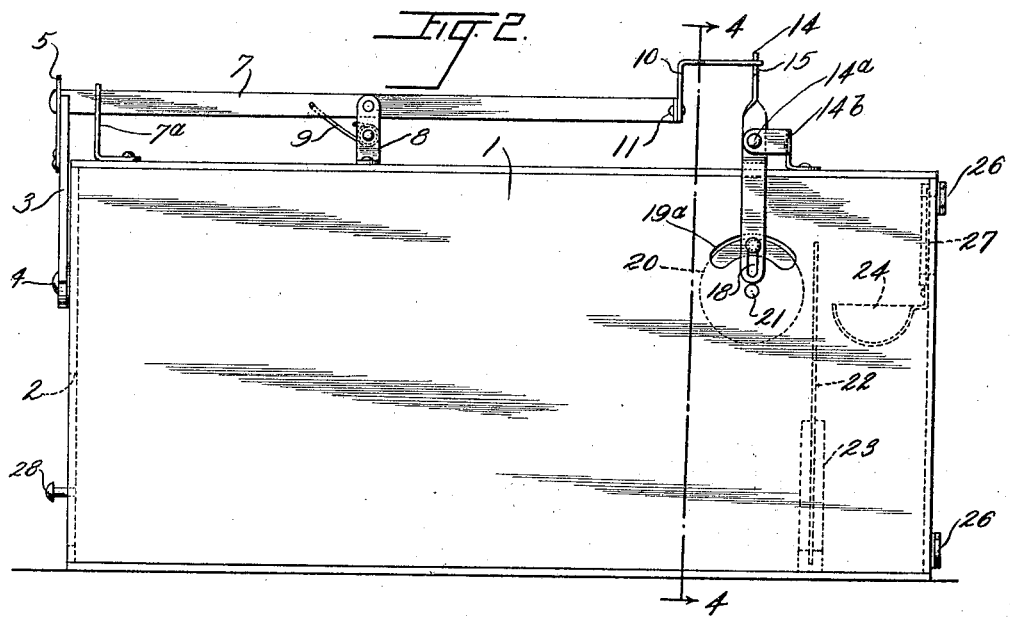

1,327,229.

Patented Jan. 6, 1920.
3 SHEETS—SHEET 2.

WITNESSES:

INVENTOR
C. A. S. Erickson
BY H. Durders
ATTORNEY

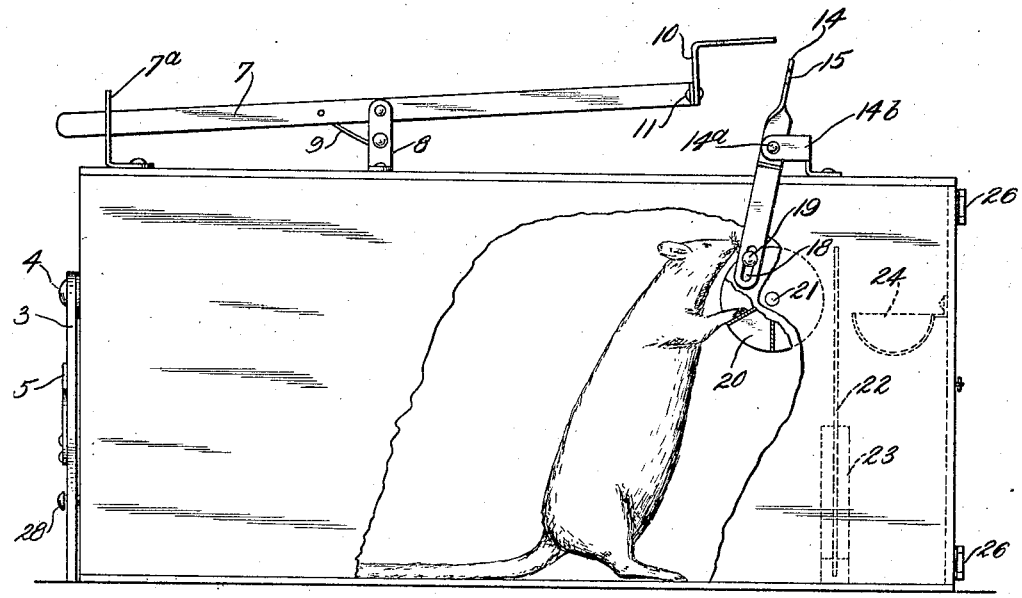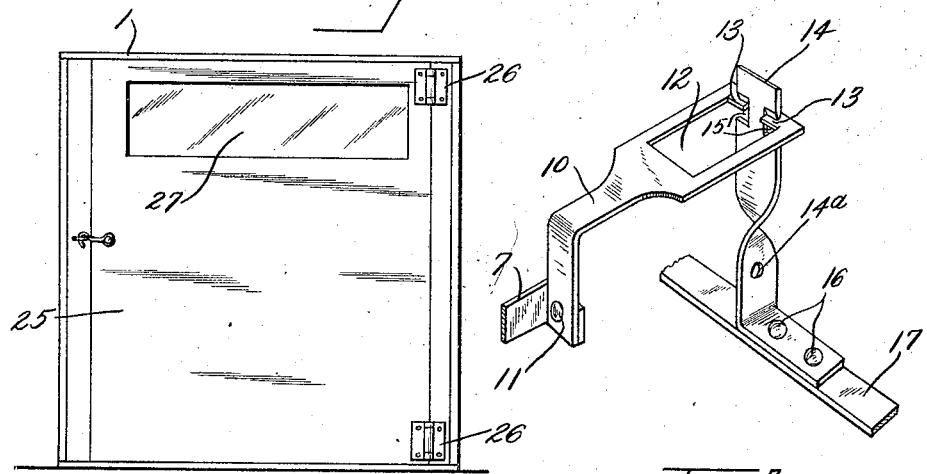

UNITED STATES PATENT OFFICE.

CARL ALBIN SYREJUS ERICKSON, OF NORCROSS, MINNESOTA.

ANIMAL-TRAP.

1,327,229.  Specification of Letters Patent.  Patented Jan. 6, 1920.

Application filed June 5, 1915, Serial No. 32,328. Renewed July 24, 1919. Serial No. 312,981.

*To all whom it may concern:*

Be it known that I, CARL ALBIN SYREJUS ERICKSON, a citizen of the United States, residing at Norcross, in the county of Grant and State of Minnesota, have invented certain new and useful Improvements in Animal-Traps, of which the following is a specification.

This invention relates to improvements in animal traps and its object is to provide simple and efficient means for operating a trap door which is set free by the animal moving the trigger in his effort to obtain the bait in the trap.

The invention consists in the combination and arrangement of parts to be hereinafter fully described in the following specification, pointed out in the claim and illustrated in the accompanying drawings which form a part of said specification and in which—

Figure 1 is a top plan view of my improved animal trap.

Fig. 2 is a side elevation of the same.

Fig. 6 is a side elevation of the trap after it is sprung, the side of the trap being partly cut away to show the manner in which the animal pulls the trigger.

Fig. 7 is a rear elevation.

Fig. 8 is a perspective view, enlarged, of a portion of the door-holding mechanism.

Like reference characters indicate corresponding parts throughout the several views.

Figure 3:
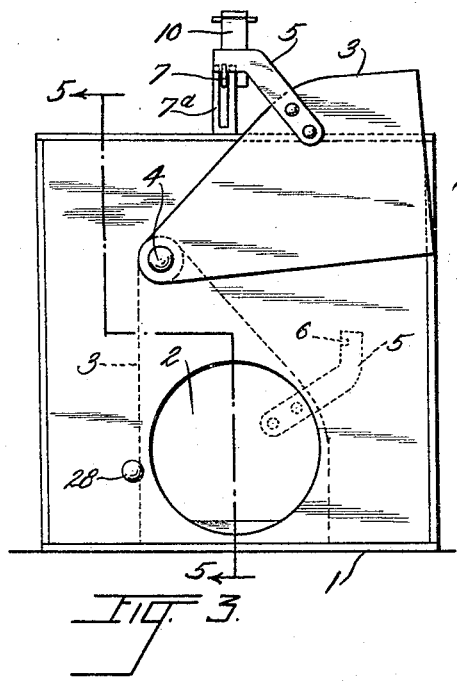
Fig. 3 is a front view with the trap door open.
Figure 4:
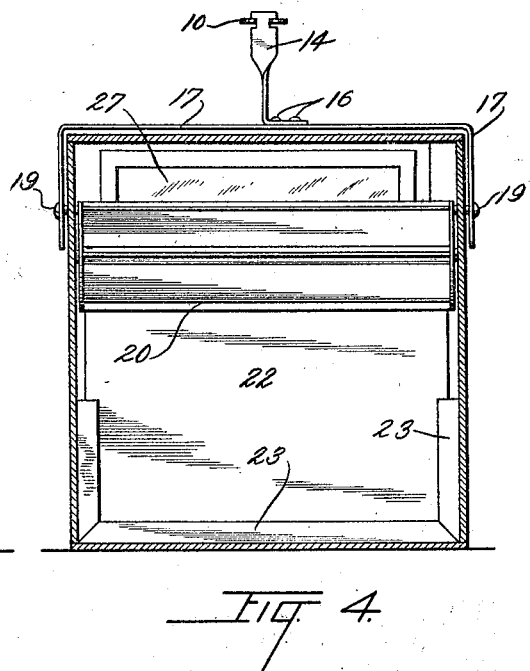
Fig. 4 is a section taken on line 4—4 of Fig. 2.
Figure 5:
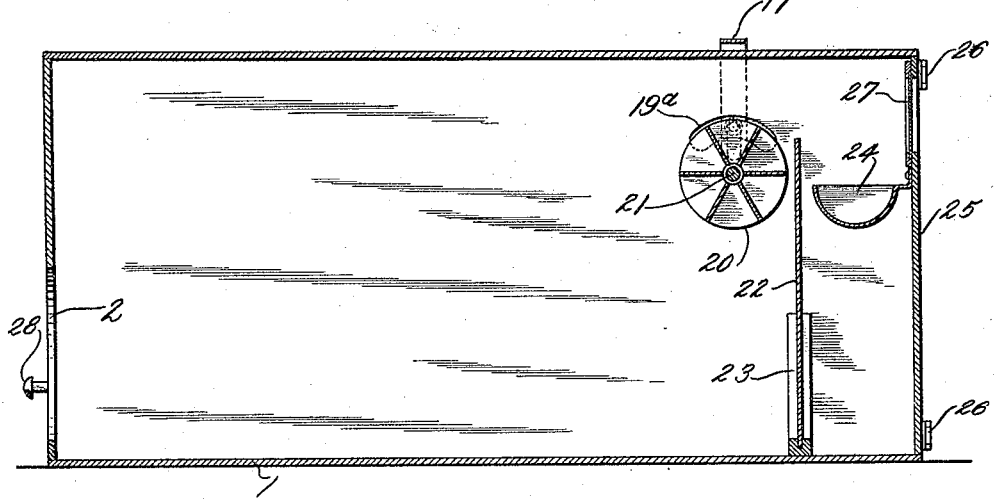
Fig. 5 is a longitudinal section taken on line 5—5 of Fig. 3.

The reference numeral 1 designates the cage which is preferably an oblong box made of any material desired provided with an opening 2 in its front end and with a door 3 pivoted as at 4 to the cage and adapted to cover the opening 2, as shown dotted in Fig. 3. The door 3 is provided with a latch 5 notched as at 6 for releasable engagement with a lever 7 movable in a guide 7ª and pivoted to a standard 8 carried by the top of the cage and further connected to said standard by a spring 9 which engages the lever to yieldingly retain it in engagement with said lever 5. To the lever 7 an angular bracket 10 is secured as at 11 and said bracket is cut out as at 12 and bifurcated as at 13 for releasable engagement with a twisted standard 14 pivoted at 14ª to a support 14ᵇ and notched as at 15 and secured as at 16 to a band 17 which extends across the roof of the trap and partly down the sides thereof and in each termination is slotted as at 18, longitudinally, to carry transverse pins 19 which extend through curved slots 19ª in the sides of the trap and are secured to ends of a treadmill 20 disposed upon a shaft 21 journaled in the sides of the cage.

Adjacent the treadmill within the cage is a transverse partition 22 which extends from the floor of the cage almost to the top thereof and which is supported in a brace 23 and between said partition and the rear end of the cage is a bait receptacle 24 secured to the end cage door 25 which is hinged as at 26 to the cage and provided with a window 27. To set the trap the front door 3 is raised into the position shown in full lines in Fig. 3, with the lever 5 engaging the lever 7 to so retain the door and bait is placed in the receptacle 24. The animal attracted by the odor of the bait enters the open door and approaches the rear end of the trap; in an effort to reach the bait he must come in contact with the treadmill, as shown in Fig. 6, and consequently rotate the same in one or the other direction upon its shaft. This will move the band 17 and standard 14 upon its pivot and draw it out of engagement with the bracket 10 permitting the spring 9 to depress the lever 7 and release the lever 5 and allow the door 3 to drop through gravity. The stop pin 28 carried by the front of the cage will stop the door over the opening 2 in the cage imprisoning the animal when the entire trap may be immersed in water and the animal drowned.

What is claimed is:—

An animal trap, including a cage having pivotally positioned thereon a closure for the entrance-opening thereof, said closure carrying a fixed angular latch with a notch in its lower edge, a bifurcated guide on top of said cage, an automatically engaging lever received by the notch of said latch, a second lever fulcrumed upon said cage and moving in the same direction as the length of the first-referred to lever, said first-referred to lever carrying an angular bracket cut-out and bifurcated to receive said second lever, said second lever having notches in its lateral edges for engagement with the bifurcation of said angular bracket, and a tread-mill member hung in the sides of said cage, said second lever having eccentric and slidable connection with said tread-mill member.

In testimony that I claim the foregoing as my own I have hereto affixed my signature in the presence of two subscribing witnesses.

CARL ALBIN SYREJUS ERICKSON.

Witnesses:
F. C. ANDERSON,
T. M. THAYER.